Dec. 8, 1953     H. L. BOWDITCH     2,661,725
PNEUMATIC VALVE PRECISE POSITIONING DEVICE
Filed May 29, 1952     3 Sheets-Sheet 1
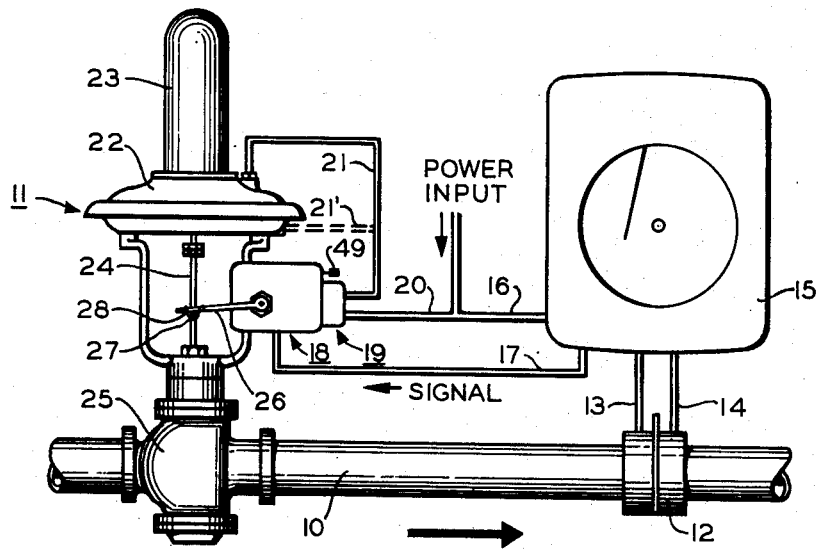
FIG. I
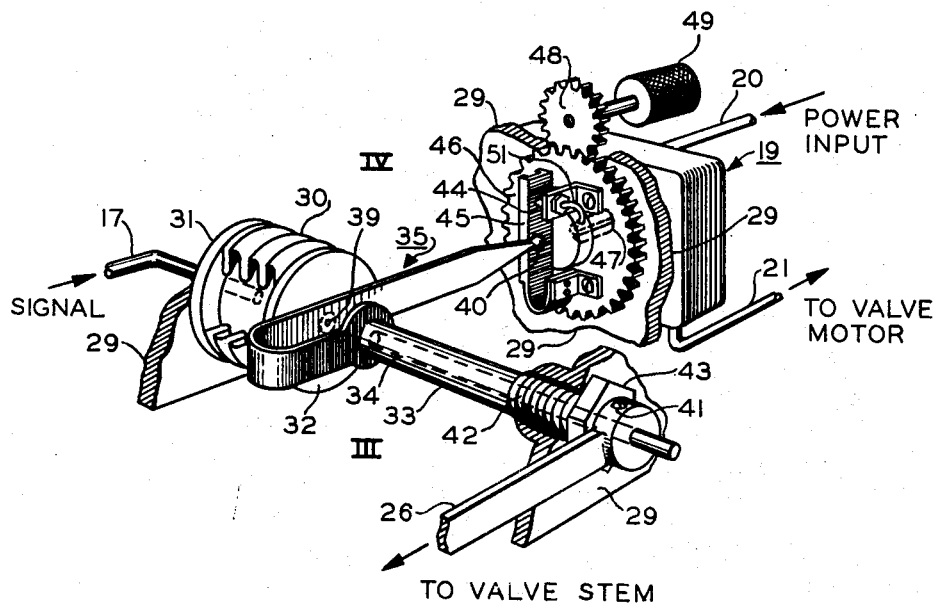
FIG. II
*INVENTOR.*
HOEL L. BOWDITCH
BY
*Curtis, Morris & Safford*
*ATTORNEYS*

Dec. 8, 1953 H. L. BOWDITCH 2,661,725
PNEUMATIC VALVE PRECISE POSITIONING DEVICE
Filed May 29, 1952 3 Sheets-Sheet 2
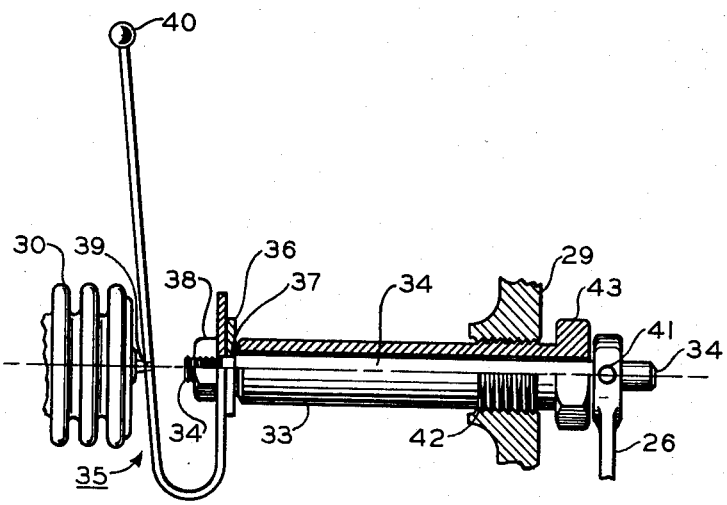
FIG. III
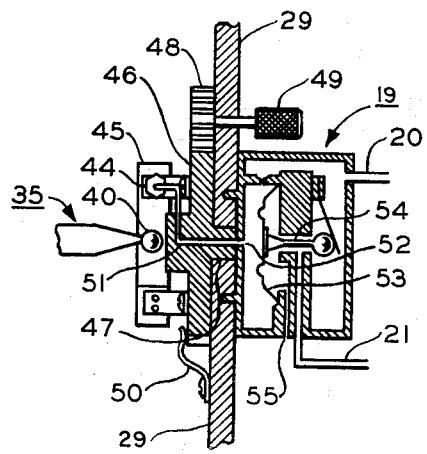
FIG. IV
INVENTOR.
HOEL L. BOWDITCH
BY
Curtis, Morris & Safford
ATTORNEYS

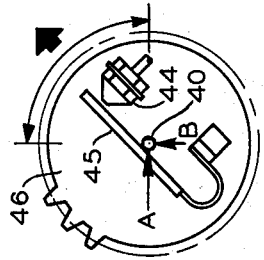
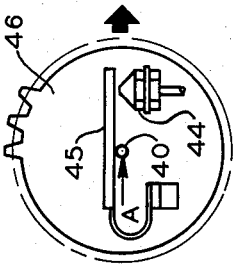
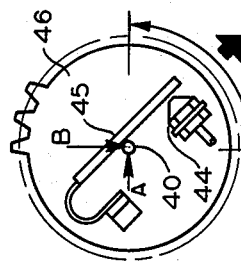
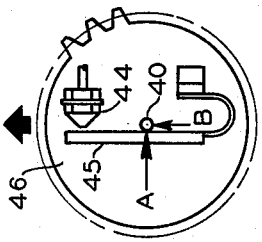
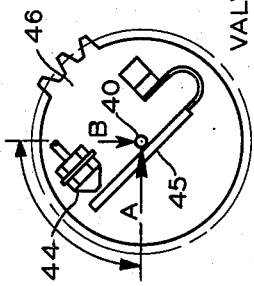
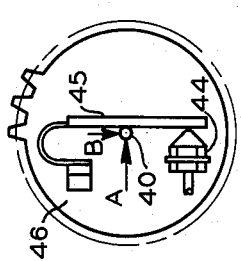
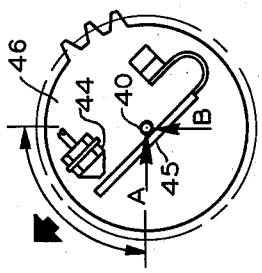
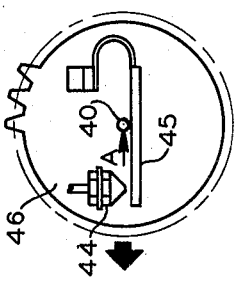
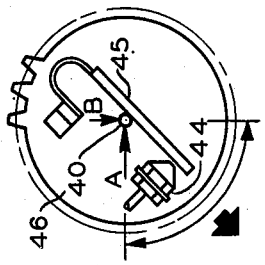

Patented Dec. 8, 1953

2,661,725

UNITED STATES PATENT OFFICE 2,661,725

PNEUMATIC VALVE PRECISE POSITIONING DEVICE

Hoel L. Bowditch, Foxboro, Mass., assignor to The Foxboro Company, Foxboro, Mass.

Application May 29, 1952, Serial No. 290,794

1 Claim. (Cl. 121—41)

This invention relates to pneumatic valve control devices for precise positioning of valve stems in exact, predetermined relation to a command signal. More particularly the invention relates to control devices of this type in which a feedback action, representative of the actual position of the valve stem is used to ensure positioning of the valve stem in precise correspondence with the value of the command signal. Such devices are commonly called "valve positioners" and a typical device of this character is disclosed in Cook Patent 2,240,244.

This invention provides a novel control device of this nature that includes universal adjustment means for variation of the relation between command signal and valve stem action. For example, this adjustment means provides for the reversal of the direction of movement of the valve stem in relation to the direction of change of the command signal. Further, this adjustment means permits full range adjustment of the ratio between change in the value of the signal and corresponding change in valve position. Thus with the adjustment means of the present invention this ratio, sometimes called a proportioning band, can be varied from zero to infinity.

A typical structure embodying the present invention includes a valve stem, movable by a pneumatic motor which is operated by a pilot valve that is responsive to a command signal, and mechanism providing a feedback action from the valve stem to the pilot valve. The pilot valve is operated by a member which moves in response to changes in either the command signal or the feedback action, and the pilot valve is adjustable as a unit with respect to this member to vary the relation between the command signal and the valve stem action.

Devices for such precise positioning of valve stems are used in process control systems, for example, a flow control system having a flow sensing arrangement, a pneumatic control instrument responsive to signals from the sensing arrangement, and a valve controlled by the instrument with the valve set up to vary the flow according to the control.

Valve positioning devices of the present type may be considered secondary controllers, located between the main control instrument and the valve, and generally being mounted on the valve, with the signal from the main controller being applied to this secondary controller as a command signal, and the output of this secondary controller being applied to operate the valve. The essential feature of these devices is that a feedback action is provided which is representative of the actual position of the valve stem. Through this action, a comparison is made of actual valve stem position and the precise position called for by the command signal value and failure of the stem to achieve this precise position produces an action that modifies the supply of valve operating power to ensure that the actual position of the valve stem becomes the precise position called for by the command signal.

Whereas such devices have been used in the past for the precise positioning of valve stems, the range of adjustment of the proportioning band of the device was limited, and when the relation between the direction of change of the command signal and the direction of valve stem movement was reversed, as is often desirable, a substantial remounting and rearrangement was necessary to adapt the control device to this new condition.

This invention overcomes these disadvantages by providing full range proportioning band adjustment, and by providing a simple adjustment for reversing the direction relation between the command signal and the valve stem movement.

Other objects and advantages of this invention will be in part obvious and in part pointed out hereinafter. The many objects and advantages of the present invention may best be appreciated by reference to the accompanying drawings, which illustrate a preferred embodiment of the present invention, and wherein:

Figure I is a schematic illustration of a flow control system wherein a device incorporating the present invention can be advantageously employed;

Figure II is a perspective, partially in section, of a mechanism embodying the invention;

Figure III is a top view, partially in section, of the adjustment assembly indicated by III, in Figure II;

Figure IV is an elevation, partly in vertical section, of the pilot valve pneumatic nozzle and baffle unit indicated by IV, in Figure II;

Figure V is a schematic illustration of the pilot valve assembly of Figure IV in the on-off or zero proportioning band position of adjustment shown in Figure II;

Figure VI shows the pilot valve adjusted to a proportioning position in a quadrant wherein the proportioning band can be adjusted;

Figure VII shows the pilot valve at a position wherein the proportioning band is infinite i. e. changes in the signal valve produce no valve movement;

Figure VIII shows the pilot valve adjusted to a proportioning position in another proportioning quadrant in which the valve stem direction is reversed as compared with Figure VI;

Figure IX shows the pilot valve adjusted to a position of reverse on-off action;

Figure X shows the pilot valve adjusted to a lockup position in a lockup quadrant;

Figure XI shows the pilot valve adjusted to another position wherein the proportioning band is infinite;

Figure XII shows the pilot valve adjusted to a lock-up position in another lockup quadrant; and Figure XIII shows the pilot valve in the same quadrant as Figure XII, but this quadrant has been made a proportioning quadrant by reversal of the valve motor.

Referring to Figure I, a flow pipe 10 is shown, with a flow pipe control valve 11 and an orifice plate unit 12 mounted thereon. Pressure tap pipes 13 and 14 are provided at upstream and downstream locations, respectively, in relation to the orifice plate. The pressure tap pipes 13 and 14 lead to a pneumatic controller 15 which is provided with a pnuematic power input pipe 16 and a pneumatic signal output pipe 17. The controller 15 may be any of the common structures for producing a pneumatic signal as a function of a flow. A similar controller is shown in my copending U. S. patent application for a Controller, Serial No. 692,102 filed August 21, 1946, now Patent No. 2,631,570.

The controller output pipe 17 carries the controller output pneumatic signal to a secondary pneumatic control unit 18, which operates to insure accurate adjustment of the flow pipe valve 11 with respect to pneumatic command signals received by the control unit 18 from the main controller 15. The secondary control unit 18 has a pneumatic relay 19 secured thereto and the pneumatic output signal of the unit 18 is a pilot signal for the relay 19. This relay may be any of the common structures used to control an operating pneumatic pressure with a small, pilot pressure. Such a relay is shown in my copending application, identified above.

The relay 19 is provided with a pneumatic power input pipe 20, and a pneumatic power output pipe 21. The relay output pipe 21 carries pneumatic operating pressure, as controlled by the secondary controller 18, to the flow pipe control valve 11. The valve 11 may be any of the common diaphragm type valves. In this valve there is a diaphragm head 22 which is the terminus for the relay output pipe 21, a biasing spring head 23, and a stem 24 operable by movement of the diaphragm in the head 22. A valve plunger body 25 is mounted in the flow pipe 10.

The connection of the pipe 21 to the head 22 is intended to indicate an arrangement in which increased pressure causes the valve stem 24 to move downward. This connection may be reversed, as indicated in dotted lines by pipe 21' so that increased pressure causes the valve stem to move upward. Such a reversal is disclosed in my Patent No. 2,536,000 issued December 26, 1950, entitled "Reversible Air Operated Motor."

There is a mechanical linkage connection between the flow pipe control valve stem 24 and the secondary pneumatic controller 18. This connection is in the form of a lever 26, pivoted in the secondary controller 18 and secured to the valve stem 24 for vertical movement therewith. The lever 26 is secured to the stem 24 through a pin 27, fixed on the stem 24, on which the lever rests, and a spring clip 28 which ties the lever and the pin together and yet allows the necessary sliding movement of the lever over the pin as the stem 24 moves in a straight line and the lever 26 moves arcuately.

Referring to Figure II, which illustrates the structure of the secondary controller 18, fragments are shown of a housing 29 therefor. At the left of the drawing, a bellows 30 is mounted with an end 31 fixed to the housing and an end 32 free to move in essentially a straight line in response to pressure variation within the bellows 30. Such pressure variation is provided through the main controller output pipe 17. The pipe 17 extends through the housing 29 and the fixed end 31 of the bellows 30, to pneumatically connect the bellows with the output of the main controller 15, Figure I.

In axial alignment with the bellows 30, an adjustment sleeve 33 extends through the opposite wall of the housing 29, with a rotatable shaft 34 extending through the sleeve in a close fitting but easy-running bearing relation therewith. The bellows 30 and the shaft 34 are connected by a flexible U member 35. This member is formed of flat strip stock, bent flat face to flat face, with the flat faces lying transversely of the axis of the bellows and the shaft. One arm of the U member 35 is fixed to the inner, bellows end of the shaft 34, for rotation therewith so that the whole U member rotates with the shaft. As shown in Figure III, the U member is held on the shaft 34 between a washer 36 which abuts on a shaft shoulder 37, and a nut 38 threaded on the inner end of the shaft 34. The other arm of the U member is pivoted on a pin 39 which is fixed on and extends axially from the free end 32 of the bellows 30. This pivoted arm extends beyond this pivot point and terminates in an end with a ball 40 fixed thereon as a mechanical contact for operating a pneumatic pilot valve, as explained later herein. The U member 35 is sufficiently flexible to allow the U arms to be bent toward each other as the bellows 30 expands, and, as the bellows contracts, the pivoted arm of the U member follows the bellows under the influence of spring bias established in the U member. These movements provide the ball 40 with an essentially straight line component of movement in general parallelism with the axis and movement of the bellows 30.

The valve stem lever 26 is secured to the outer end of the rotatable shaft 34, which extends beyond the adjustment sleeve 33 for this purpose. With this arrangement, movement of the valve stem 24 rotates the shaft 34 and provides the U member ball 40 with an arcuate component of movement in a plane substantially at right angles to its straight line component of movement as derived from the bellows 30. The lever 26 is adjustable with respect to the shaft 34 through the use of a screw 41 which may be loosened to allow the lever 26 to be pivoted on the shaft to a new position, whereupon the screw 41 is tightened to again firmly join the lever and the shaft. This adjustment is a zeroing action to orient the arcuate movement of the ball 40 with the movement of the valve stem 24.

As shown in Figures II and III, the adjustment sleeve 33 which contains the shaft 34 extends between the lever 26 and the U member 35. This sleeve has an outer surface portion 42 which is threaded through the wall of the housing 29. The outer end of the sleeve 33 is provided with an integral nut 43 for adjustment of the sleeve in and out of the housing 29. Such adjustment carries the U member 35 with it through the engagement of the sleeve 33 with the U member in one direction, and with the lever 26 in the other direction. The adjustment sleeve rotates independently of the shaft rotation and vice versa. This sleeve adjustment is for zeroing the U member contact ball 40 with respect to its straight line component of movement: that is, it provides a desired starting point from which to move the ball 40 under the influence of the movement of the bellows 30. The straight line bellows movement and the rotary movement of the shaft 34 thus may be combined to produce a resultant movement in the contact ball 40. As viewed in Figure II, the U member 35 operates in a generally horizontal position, with only a small amount of rotary movement, and hence the arcuate movement of the ball 40 may be considered essentially vertical movement.

Figures II and IV illustrate a pneumatic pilot valve arrangement which is operatively associated with the U member contact ball 40. The pilot valve comprises a pneumatic nozzle 44 and a baffle 45, both fixed on a rotatable gear 46 for relative movement with respect to each other. The baffle has a spring bias incorporated therein which urges it toward the nozzle and can be moved away from the nozzle by the action of contact ball 40. The nozzle 44 is pneumatically connected with the pneumatic relay 19. The operation of a nozzle-baffle structure in relation to a pneumatic relay is disclosed in my copending application Serial No. 692,102, previously identified herein. The gear 46 is mounted on a wall of the housing 29 for rotation on an arbor 47 integral with the gear 46 and extending through the housing wall to the relay 19 which is mounted on the outside of the housing. The axis of the gear and arbor is horizontal, at right angles to the axis of the bellows 30 and the shaft 34, and in a plane containing the bellows and shaft axes. The movement of the baffle 45 is in a vertical plane, parallel to the axis of the bellows and shaft. The movement of the bellows 30 is in a direction generally parallel to the plane of movement of the baffle 45, and the arcuate movement of the contact ball 40 as imparted by rotation of the shaft 34, is in a plane generally perpendicular to the bellows movement direction and to the plane of movement of the baffle 45.

The baffle 45 is operatively associated with the U member contact ball 40, and movement of the baffle with respect to the nozzle is accomplished by sliding engagement of the ball with the baffle and movement of the ball as a result of the movements of the bellows 30 and the valve stem 24.

The sliding engagement of the ball 40 with the baffle 45 imparts a movement to the baffle 45 in a plane perpendicular to the arcuate movement plane of the ball 40. The sliding engagement of the ball is, with respect to the baffle 45, effectively straight line movement of a point contact, notwithstanding the arcuate movement of the ball 40.

The effect of the movement of the ball 40 on the nozzle-baffle relation of the pilot valve is variable and depends upon the direction of application of the ball movement to the baffle 45. This direction depends upon the adjusted rotary position of the pilot valve, that is, the position of adjusted rotation of the gear 46. The gear 46 is rotated by the rotation of a pinion 48 which is meshed with the gear 46 and mounted above the gear, with a manual adjustment knob 49 being provided for turning the pinion. Spring clips 50, Figure IV, are mounted on the housing 29 and engage the gear 46 to hold it against the housing in the adjusted positions of rotation of the gear.

As shown in Figures II and IV, the pneumatic relay 19 previously shown in Figure I, is mounted on the housing 29 on the outside of the wall which supports the gear 46. Pneumatic connection is made between the nozzle 44 and the relay 19 through a pipe 51 extending from the nozzle to the central portion of the gear, and back through the gear arbor 47 into the relay 19. With this arrangement the pneumatic connections are easily sealed against leakage by means of close-fitting relationship between the gear and its arbor with the housing, and between the relay and the housing. The relay 19 has an opening 52 therein of the size of the nozzle pipe 51 and aligned therewith as a continuation of the nozzle pipe 51. The rotation of the gear 46 is not hampered by pneumatic pipes or connections and full rotation in either direction is thus made possible.

The relay 19 operates to supply pneumatic power in response to the back pressure created by restriction of the small pneumatic flow through the nozzle 44 by the baffle 45. Air is supplied to the nozzle from the pneumatic power supply pipe 20 and passes through a restriction in the relay that permits only a small flow of air to the nozzle. The nozzle back pressure is applied to a diaphragm 53 in the relay 19. The diaphragm 53 operates a supply and waste valve mechanism 54 to provide a valve motor operating output pressure for the valve 11, Figure I, from the relay, or to exhaust air from the valve motor through an outlet 55 to atmosphere.

In the operation of this control system, variation in the relation between a change in the command signal and the valve stem action which it calls for is a function of the adjusted rotary position of the pilot valve gear 46. That is, it is a function of the direction of application of the movement of the contact ball 40 to the baffle 45, and this varies as the baffle is rotated with the gear with respect to the U member 35 and the contact ball 40 thereon.

Figures V through XII illustrate the variation of the proportioning band as the gear 46 is adjusted through 360 degrees of rotation. Adjustment may be made to reverse the direction of the valve stem movement with respect to the direction of change of the command signal, and to vary the amount of signal change that corresponds with a given valve stem movement. The signal-to-valve relation presented herein for illustration, is proportional. The gear adjustment may vary this relation, in a single quadrant of ajustment from a position producing a zero proportioning band, or on-off control, through a full range of variation to and including a position producing an infinite porportioning band.

Considering the pilot valve to be in a position for proportioning action, this system is activated by applying a pneumatic command signal to the bellows 30. This applies effectively straight line movement to the contact ball 40, which in turn changes the position of the baffle 45 with respect to the nozzle 44. Such a change varies pneumatic flow from the nozzle 44 to vary the pilot pressure in the relay 19. This variation operates the relay to change the operating pressure in the valve diaphragm head 22. Movement of the valve stem 24 is thus caused, and this movement produces a corresponding movement of the contact ball 40 through the mechanical linkage comprising lever 26, shaft 34, and the U-member 35. This corresponding movement is rapid, and the straight line and arcuate movements of ball 40 are applied to the U-member 35 effectively simultaneously. The final positional relation between the nozzle and baffle is thus the result of the combined movements of the bellows 30 and the valve stem 24. In each pilot valve proportioning position and for each signal value in the bellows 30 there is a correct valve stem position. The nozzle-baffle relation and the system as a whole will not come to rest, or steady state, until this correct stem position is reached.

There are numerous combinations of structure and movements which can be made as embodiments of this invention. For purposes of illustration, and with particular reference to Figures V through XII, wherein each figure represents the pilot valve in a different position of rotary adjustment, the following conditions are assumed: An increase in the input pneumatic signal from the controller 15 to the bellows 30, referred to below as a positive command signal, is assumed and is represented in each figure by the arrow A. The flow pipe control valve 11 is arranged so that upon pressure increase in the diaphragm head 22, the valve stem 24 is moved downwardly. The mechanical arrangement is such that the valve stem 24 and the contact ball 40 move in opposite directions; for example, as the valve stem 24 moves downwardly, the contact ball 40 is moved upwardly, as indicated in certain of the figures by the arrow B. Further, the zero position of the contact ball 40 is on the axis of rotation of the gear 46. This zero position represents the mid-point in the range of command signal values, and produces, by its effect on the relation between the nozzle 44 and the baffle 45, a mid-point in pressure in the valve head 22, that is, an operating pressure at which the valve stem is in the mid-point of its possible movement. It may be noted that with the contact ball 40 at zero, the gear 46 may be completely rotated without changing the nozzle-baffle relation and therefore without changing the valve stem position.

In each of the Figures V through XII, the nozzle 44 and the baffle 45 are shown in relation to the contact ball 40. The positive command signal movement, as derived from the bellows 30, is represented as applied to the contact ball 40 in the direction of the arrow A. The feedback movement, in cases where it exists, is derived from the valve stem movement in response to the positive command signal, and is represented as applied to the contact ball 40 in the direction of the arrow B. The resultant movement of ball 40 produces operational movement of baffle 45.

The pilot valve position of Figure V provides a zero proportioning band, or simple on-off action. As movement A is applied to the contact ball 40, the baffle 45, by the resilience of its own structure, moves to cover the nozzle 44 and restrict flow therefrom. Through the action of the relay 19, this restriction of the nozzle flow causes pressure to build up in the control valve diaphragm head 22. In turn, this pressure build up causes the valve stem 24 to move downwardly. Lever 26 is thus pivoted downwardly, and through the consequent rotation of the shaft 34, the contact ball 40 is moved upwardly. In this (Figure V) position, however, the baffle 45 is vertical, and the feedback movement B also is vertical and parallel to the baffle, therefore having no effect on the nozzle-baffle relationship. Accordingly the pilot valve action is on-off, following directly and solely the command signal which produces movement A and, through the resilient bias of the U-member 35 against the bellows 30, also following the reverse of movement A when the command signal decreases.

The Figure VI position illustrates a quadrant of rotary adjustment in which the pilot valve has a proportioning action. The proportioning relation is variable in this quadrant, by adjustment of the gear 46, through a full range of proportioning values, with a widening of the proportioning band being achieved as the gear is adjusted in a clockwise direction. In Figure VI, movement A again causes the nozzle to be covered, the valve stem to move down, and the feedback movement B is upward. With the baffle at an angle, as shown, the upward feedback movement B tends to uncover the nozzle again, and a balance is achieved with the valve positioned in precise correspondence with the signal value.

The Figure VII position is another possible adjustment of gear 46. In this position the proportioning band is infinitely large. Movement A is parallel to the baffle and has no effect on the nozzle-baffle relation. Since there is no appreciable movement of the baffle, the valve stem remains substantially stationary and there is no feedback movement. Therefore no arrow B appears in this figure.

The Figure VIII position, with reference to the Figure VI position, illustrates an important feature of this invention, namely the reversal of the direction of the valve stem movement in response to a positive command signal by means of the simple adjustment of the gear 46 from the one quadrant to the other. This means that the often desirable change from a valve stem downward movement in response to a positive command signal to a valve stem upward movement in response to a positive command signal, may be accomplished by one simple adjustment, that is, rotation of the gear 46. In the Figure VIII position, the baffle 45 has been rotated about the ball 40 to such a point that movement A now uncovers the nozzle 44 rather than allowing the nozzle to be covered, as in Figure VI. Assuming the ball 40 to be in its zero position when the baffle is rotated by adjusting the gear 46, this rotation produces no change in the nozzle-baffle relation. In instances where the ball 40 is at another position, for example, to the left of its zero, rotation of the baffle has the effect of moving the ball 40 the same distance to the right of its zero in so far as the nozzle-baffle relation is concerned. Actually, the ball 40 is not moved, but the baffle moves with respect to the nozzle in such cases of off-center position of the ball 40 at the time of the adjustment of the gear 46. The position of the ball 40 at the time of the adjustment is otherwise immaterial.

Again referring to Figure VIII, the effect of movement A is to uncover the nozzle 44, and the consequent reduction of pressure in the valve head 22 moves the stem upward and the ball 40 downward. This downward movement tends to cover the nozzle 44 and a proportioned position of balance is achieved.

The Figure IX position provides an on-off relation in reverse of the relation of Figure V. The positive command signal movement A uncovers the nozzle, thereby releasing pressure from the valve head 22 and permitting the valve stem to move up. Although the movement A thus produces a feedback downward movement B, the movement B is parallel to the baffle and has no effect thereon.

Figure X shows the baffle and nozzle in what may be characterized as a "lock-up" position. Movement A uncovers the nozzle 44 to move the valve stem up and movement B is therefore downward, in aid of movement A. This is considered as "lock-up" action because no balance is reached as in proportioning action and also because, after movements A and B have occurred, the valve stem travels to its uppermost position and remains there until a considerable decrease in the command signal occurs.

The Figure XI position is one producing an infinite proportioning band, like the Figure VII position, wherein the movement A has no effect on the nozzle-baffle relation, since it is parallel to the baffle. Consequently there is no feedback movement.

The Figure XII position illustrates another quadrant where lockup action occurs. The baffle has now been rotated to the point where the movement A allows the baffle 45 to cover the nozzle 44 and build up back pressure. The resulting upward feedback movement B is in aid of the movement A and thus the nozzle remains covered.

The steps of adjustment indicated by Figures V through XII are chosen arbitrarily to illustrate the action of the device of this invention. The actual adjustment is not step by step but may be continuous by gear rotation to the desired position.

The pilot valve may be adjusted to adapt the system to certain other changes which affect the conditions of operation of the system. For example, reference is made to the reversal of the valve motor as previously described in connection with Figure I by connecting the relay discharge to pipe 21' rather than to pipe 21. This change reverses the direction of the valve stem movement with respect to the direction of the command signal. In other words, after this change has been made, increased pressure in the valve head 22 moves the valve stem up instead of down as in the previous arrangement. Referring back to Figure VIII and the valve stem direction reversal action illustrated thereby; in that case it was still true that increased pressure in the valve head moved the valve stem down, even though a positive command signal moved the valve stem up. In this case, as illustrated by Fig. XIII, a positive command signal moves the valve stem up by increasing the pressure in the valve head, because of the change in the power application to the valve head 22. As shown in Figure XIII, the system is adapted to this new condition by the simple adjustment of the pilot valve to the quadrant illustrated. Under the previously discussed conditions this was a lockup quadrant, as in Figure XII, but here, since movement A causes the stem to move upward and the ball 40 down, the action becomes proportional and comparable to that of Figures VI and VIII in so far as proportioning action is concerned. With the valve motor connected as just described, all the positions of adjustment are obtainable, as compared to Figures V through XII, the difference being that various relations are found at different positions of rotary adjustment of the gear 46.

Considering the control system of this invention generally, vibration is a problem in many installations of this nature. In this device, the ill effects of vibration are reduced by the absorbing action of the flexible U member 35. Further steps to avoid vibration disturbance or wear may comprise resilient mounts or connections, particularly between the contact ball 40 and the baffle 45. A sleeve or other cover or coating of plastic may be used on the contact ball 40 and a plastic surface may be provided on the baffle 45 in the area engaged by the ball 40. A rigid polyvinylchloride to a thickness of approximately .008 inch may be used to advantage.

This invention, therefore, provides a novel valve controller which is adaptable to a variety of control relations, and which includes means for readily securing any of a full range of proportioning band values between and including zero and infinity. Also the controller is easily adjustable to accord with or to produce, reversal of valve action.

As many embodiments may be made in the above invention, and as many changes may be made in the embodiment above described without departing from the spirit and scope of the invention as described herein and shown in the accompanying drawings, it is to be understood that all matter hereinbefore set forth or shown in the accompanying drawings is to be interpreted as illustrative only and not in a limiting sense.

I claim:

In a pneumatic control system for precisely positioning a valve stem in accordance with a command signal in a predetermined proportional relation which is variable by adjustment, with said adjustment covering a full range of proportion variation including infinite proportion, and providing positions of reverse action whereby said system may be adapted to operate with a reversal of stem movement direction with respect to a positive command signal, in combination, a pneumatic motor for actuating said stem, a pneumatic pilot valve unit for operating said motor, and means for controlling said pilot valve unit jointly by said command signal and said stem whereby the actual position of said stem is utilized as a factor in the actuation of said stem, said pilot valve unit comprising a pneumatic relay having a pneumatic pipe connection with said motor, a support rotatably mounted with respect to said relay and having an axially extending opening therein as a pneumatic connection with said relay, and a nozzle and a baffle mounted on said support with said baffle movable with respect to said nozzle to vary pneumatic flow therefrom, with said baffle movement in a plane parallel to the plane of rotation of said support, and a pneumatic pipe connecting said nozzle and said axial opening of said support, and said controlling means comprising a bellows for responding to said command signal with an essentially straight line movement, a lever movable with said stem, a shaft rotatable by said lever, and a flexible U member secured to said shaft and pivoted on said bellows so as to be responsive to the movements of both said bellows and said shaft, with said U member having an arm in operative engagement with said baffle to produce said baffle movement and with said engagement being the only operative connection between said arm and said pilot valve unit, said U member arm being disposed in a plane essentially perpendicular to the plane of movement of said baffle, with the movements of said arm in response to said bellows and shaft movements being, at least while said arm is in said engagement with said baffle, in planes essentially perpendicular to each other and to the plane of movement of said baffle, and with the position of rotation adjustment of said nozzle-baffle support being a variable factor in said adjustment of the proportional relation between said command signal and said valve stem position.

HOEL L. BOWDITCH.

References Cited in the file of this patent

UNITED STATES PATENTS

| Number | Name | Date |
|---|---|---|
| 2,240,244 | Cook | Apr. 29, 1941 |
| 2,427,235 | Smoot | Sept. 9, 1947 |
| 2,536,184 | Johnson | Jan. 2, 1951 |